M. R. HUTCHISON.
DIAPHRAGM HORN.
APPLICATION FILED MAY 11, 1911.
1,120,618.
Patented Dec. 8, 1914.
2 SHEETS—SHEET 2.
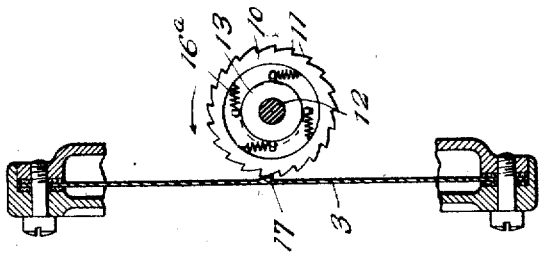
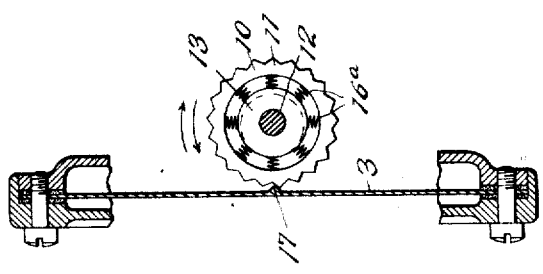
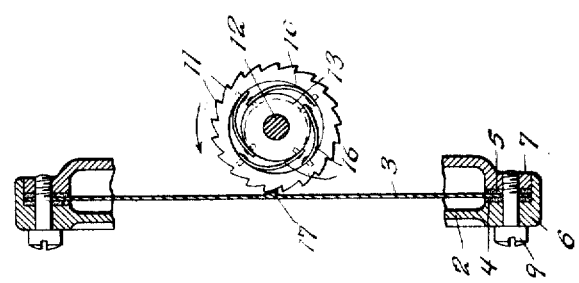
WITNESSES
Chas. F. Clagett
INVENTOR
Miller Reese Hutchison
BY
G. C. Dean ATTORNEY

UNITED STATES PATENT OFFICE.

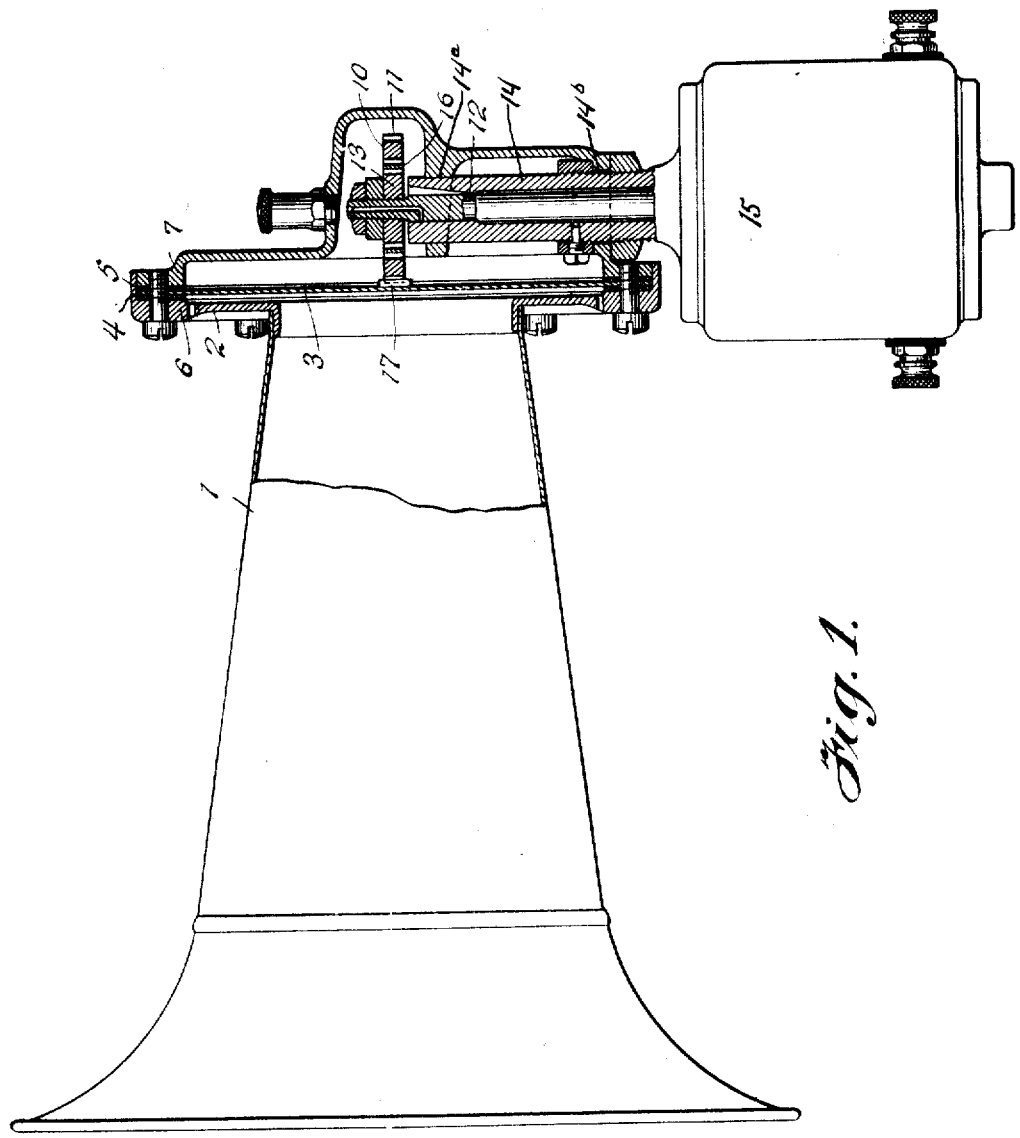

MILLER REESE HUTCHISON, OF WEST ORANGE, NEW JERSEY, ASSIGNOR TO LOVELL-McCONNELL MANUFACTURING COMPANY, A CORPORATION OF NEW JERSEY.

DIAPHRAGM-HORN.

1,120,618.

Specification of Letters Patent.

Patented Dec. 8, 1914.

Application filed May 11, 1911. Serial No. 626,490.

*To all whom it may concern:*

Be it known that I, MILLER REESE HUTCHISON, a citizen of the United States, and resident of West Orange, in the county of Essex and State of New Jersey, have invented certain new and useful Improvements in Diaphragm-Horns, of which the following is a specification.

This invention relates to mechanically-actuated alarm or signaling devices wherein the sound is produced by the vibration of a diaphragm, reed, spring tongue or the like, by means of a rotary driver having cam teeth or eccentric projections and driven at high speed by power means, for example an electric motor. In such signals the vibration of the diaphragm is preferably in the nature of a bodily to and fro movement, and such vibration may be effectively produced by a rigid driver rigidly held, as shown for example, in my Patent No. 923,049.

According to my present invention I interpose yielding means or a resilient mounting between the shaft, which is preferably rigid and rigidly held, and a member carrying a series of cam teeth or eccentric projections, for engagement with a diaphragm wear-piece, or other surface, for the purpose of actuating the diaphragm. Preferably this cam member is in the nature of a ring encircling the shaft.

The yielding connection between the shaft and the cam ring is preferably a spring mounting and serves as a cushioning means, as the driving connection between the shaft and the ring, and as the support for the latter. The action of the device may vary considerably according to the relation between the stiffness and inertia of the diaphragm, the stiffness of the spring mounting, and the inertia of the cam ring, and the speed of rotation. With a relatively stiff spring mounting, the action of the cams in riding over the diaphragm wear-piece or other contact surface will be primarily or entirely a cam-forcing action, producing outward displacement of the diaphragm with minimum yielding of the spring, each cam on riding off the wear-piece permitting the diaphragm to execute a free backward swing, and the successive forcing actions being cushioned to a degree according to the range of yielding of the spring mounting. This range is obviously dependent on the relation between the stiffness of the diaphragm and the stiffness of the mounting. With an extremely flexible spring mounting, each cam contact results mainly in the ring carrier being cammed away from the diaphragm against the tension of the spring mounting, the diaphragm-forcing being minimum, and the sliding of the cam tooth off the wear-piece permitting the ring carrier to spring toward the diaphragm under the actuation of the spring, so as to deliver a blow to the wear-piece. In this instance the diaphragm vibrations, and therefore the sound, will be mainly produced by what is in effect a cam-set, spring-actuated hammer. Between these extremes there are a large number of intermediate conditions in which the cam-forcing action and the spring-hammering action will both be present, one or the other predominating in a degree according as the conditions outlined are more favorable to the one or the other. Another case that may be considered is one where the shaft is rotated at a speed sufficiently high and the cam ring has sufficient inertia, so that the spring mounting is unable in the short interval between cam contacts to restore the cam ring to normal position. In such a case the cam ring at normal operating speed assumes a more or less definite position in space with relation to the diaphragm. This may be merely sufficient to somewhat curtail the length of each cam-surface that engages with the wear-piece, or it may be a position of maximum removal from the diaphragm so that merely the tips of the teeth skim over the coöperating surface or projection, with consequent minimum amplitude of vibration of the diaphragm and the production of a shrill or wailing note.

Where the inertia of the cam ring is an important factor, the spring mounting enables the rotary driver to be self-adjusting to a position relatively to the diaphragm where it operates to best advantage for the power expended. This is of special value in suppressing interference between the driver and the diaphragm should the two get out of step, particularly where the diaphragm is reinforced or controlled in its vibration by a strong or powerful resonator.

In the accompanying drawings illustrating certain of the possible embodiments of my invention:

Figure 1 is a view of a complete signal, partly in elevation and partly in section;

Fig. 2 is a sectional plan, showing the shaft, actuator, yielding connection, and diaphragm, the clamping portions of the casing being shown holding the margins of the diaphragm, and the remainder being omitted; and Figs. 3 and 4 are similar views of modifications.

The numeral 1 indicates a horn or resonator carried by the front section 2 of a suitable case for the diaphragm or other vibrator. A diaphragm 3 is shown, held between cork washers or the like 4, 5 by the marginal clamping portions 6, 7 of the front section 2 and the rear section 8 of the diaphragm case. The clamping is effected by screws 9, which pass through openings in the clamping portions of the case sections and in the gaskets and the marginal region of the diaphragm. The rear section 8 of the case is formed to receive a rotary driver 10, which is shown in the form of a ring bearing a series of eccentric projections or cam teeth 11 on its periphery. This ring constitutes means for supporting and maintaining said projections at predetermined fixed distances from a common center, and, incidentally also, in fixed angular relation with respect to each other. The ring is connected to the shaft 12 or to a disk 13 secured thereto, by means of a spring mounting. The shaft is preferably rigid and rigidly held in a fixed bearing 14. This bearing 14 may be elongated so as to enter the rear section of the diaphragm case, and may be an extension of the case 15 inclosing a driving electric direct current rotary motor. The shaft 12 may be an extension of the armature shaft of this motor. The bearing sleeve 14 has external circular bearings 14ª and 14ᵇ in the rear section of the diaphragm case, and the shaft is eccentric to these bearings, so that the rotary actuator may be adjusted toward or from the diaphragm by rotary adjustment of the sleeve.

The spring mounting for the rotary cam-carrier or driver may be widely varied. In Fig. 2 it is shown as comprising a series of leaf springs 16, or short sections of spiral springs, secured at their inner ends to the disk 13 and at their outer ends to the ring. It will be obvious that one or more springs coiled spirally around the shaft may be substituted. In Fig. 3 a plurality of cylindrical spiral springs 16ª are disposed radially between the shaft and the ring, and in Fig. 4 similar springs are disposed tangentially between the parts.

In Figs. 2 and 4, the teeth 11 are shown as true cams having vertical backs, and the wear-piece or diaphragm projection 17 is also shown with a vertical back, so that the return swing of the diaphragm after an outward forcing movement, or the return movement of the actuating ring after being cammed rearward will be a free movement. Obviously, this construction permits of the driver or actuator being rotated in one direction only. Fig. 3 shows the cam teeth inclined at both sides and the wear-piece similarly inclined, so that the motor may run in either direction. The diaphragm wear-piece or projection 17 may be formed on or secured to the diaphragm in any suitable manner, or the rotary cam member may engage with another part for actuating the diaphragm.

The stiffness and inertia of the diaphragm, the weight and inertia of the rotary cam member, the stiffness of the spring mounting thereof, and the speed of rotation, may all be varied according to the particular results desired, as hereinbefore indicated. Where the rotary cam member actuates the diaphragm by repeated cam-forcing efforts, the blow or thrust may be cushioned to a degree desired by the spring mounting. On the other hand the relative stiffness of the diaphragm and spring mounting may be such that the cam action takes effect on the rotary member rather than on the diaphragm, so that the cam ring is forced rearward, to be released by the cam riding off the diaphragm projection, so that the ring may fly back under the actuation of its spring to cause the next tooth to deliver a blow after the manner of a spring-actuated hammer.

It will be seen that the yielding of the spring mounting may be only sufficient to cushion the cam-forcing of the diaphragm without material displacement or retardation of the rotary cam member or the displacement of the diaphragm and cam member, may be mutual and in opposite directions, or the displacement due to the camming may be mainly a rearward displacement of the cam member, in which event the spring hammering action is at a maximum. Where the rotary cam member has considerable mass and inertia, and especially where the spring mounting is relatively flexible, the cam member may be forced away from the diaphragm to a position which it maintains more or less definitely during operation at normal running speed, the note becoming a pronounced wail when the interception of the path of the cam projections by the diaphragm-projection is slight and the speed is very high. Throughout the range of possible action of the rotary member its ability to yield relatively to the diaphragm is of distinct advantage, in that it enables it to be self-adjusting with reference to the diaphragm.

I claim:

1. In an alarm or signal, the combination of a shaft, a cam ring carried thereby, a resilient connection between said ring and said shaft and permitting limited radial movement of one in respect to the other, and a diaphragm adapted to be vibrated by successive impacts from the cams of said ring.

2. In an alarm or signal the combination of a diaphragm, a rotatable drive shaft, high speed driving means therefor, a rotor concentric therewith and having a series of cam projections adapted to successively engage with said diaphragm to vibrate the latter, and a spring connection between said drive shaft and said rotor permitting limited circumferential movement of one in respect to the other during the rotation of said shaft and said rotor at high speed.

3. In an alarm or signal the combination of a diaphragm, a rotatable drive shaft, high speed driving means therefor, a rotor carried by said shaft and having a series of cam projections adapted to successively engage with said diaphragm to vibrate the latter, and a spring connection between said drive shaft and said rotor permitting comparatively slight limited rotative movement of one in respect to the other during the rotation of said shaft and said rotor at high speed.

4. In an alarm or signal, the combination of a shaft, high speed driving means therefor, a cam ring mounted thereon, a resilient connection between said ring and said shaft and permitting limited rotative movement of one in respect to the other during starting and stopping of said driving means, and a diaphragm adapted to be vibrated by successive impacts from the cams of said ring.

5. In an alarm or signal, the combination of a diaphragm, and mechanical means for actuating the same consisting of a rotary shaft, a rotor concentric therewith, and provided with a series of cams for imparting vibrations to said diaphragm, said cams being held at a fixed distance from a common center, means for rotating said shaft at high speed to simultaneously impart a corresponding high speed to said actuator, and a yielding connection between said actuator and said shaft and permitting a relative movement during said rotation.

6. In an alarm or signal, the combination of a diaphragm, and mechanical means for actuating the same consisting of a rotary shaft, a rotor concentric therewith, and provided with a series of cams for imparting vibrations to said diaphragm, said cams being held at a fixed distance from a common center, means for rotating said shaft at high speed to simultaneously impart a corresponding high speed to said actuator, and a spring between said actuator and said shaft and permitting a relative movement during said rotation, for driving said actuator at a speed approximating that of said shaft.

7. In an alarm or signal, the combination of a diaphragm, and mechanical means for actuating the same consisting of a rotary shaft, a rotor concentric therewith, and provided with a series of cams for imparting vibrations to said diaphragm, said cams being held at a fixed distance from a common center, means for rotating said shaft at high speed to simultaneously impart a corresponding high speed to said actuator, and a yielding connection between said actuator and said shaft and permitting a relative movement during said rotation, the engagement of said cams with said diaphragm serving to impart to the latter bodily swings and the reaction of said diaphragm serving to govern the speed of rotation of said actuator.

8. In an alarm or signal, the combination of a diaphragm, and mechanical means for actuating the same consisting of a rotary shaft, a rotor concentric therewith, and provided with a series of cams for imparting vibrations to said diaphragm, said cams being rigid in respect to each other, means for rotating said shaft at high speed to simultaneously impart a corresponding high speed to said actuator, and a yielding connection between said actuator and said shaft and permitting a relative movement during said rotation.

9. In an alarm or signal, the combination of a diaphragm, and mechanical means for actuating the same consisting of a rotary shaft, a rotor, provided with a series of cams for imparting vibrations to said diaphragm, said cams being held at a fixed distance from a common center, means for rotating said shaft at high speed to simultaneously impart a corresponding high speed to said actuator, and a yielding connection between said actuator and said shaft and permitting a comparatively slight relative movement during said rotation.

10. In an alarm or signal, the combination of a diaphragm, and mechanical means for actuating the same consisting of a rotary shaft, a rotor provided with a series of cams for imparting vibrations to said diaphragm, said cams being held at a fixed distance from a common center, means for rotating said shaft at high speed to simultaneously impart a corresponding high speed to said actuator, and a yielding connection between said actuator and said shaft and permitting a relative movement through a part of a revolution during said rotation.

11. A sound emitting device for alarm signals consisting of an acoustic diaphragm, a rotor for imparting vibrations thereto, a shaft supporting said rotor, means operated positively and directly in one direction for rotating said shaft at high speed, and a resilient motion transmitting member connecting said shaft and said rotor, and permitting said shaft to start rotating prior to the starting of rotation by said rotor and continue rotation until the tension of said resilient means exceeds the resistance which said diaphragm offers to the rotation of said rotor.

12. A sound emitting device for alarm signals consisting of an acoustic diaphragm, a rotor for imparting vibrations thereto, a shaft supporting said rotor, means operated positively and directly in one direction for rotating said shaft at high speed, and a spring connecting said shaft and said rotor, and permitting said shaft to start rotating prior to the starting of rotation by said rotor and continue rotation until the tension of said spring exceeds the resistance which said diaphragm offers to the rotation of said rotor.

Signed at New York city, in the county of New York, and State of New York this 9th day of May, A. D. 1911.

MILLER REESE HUTCHISON.

Witnesses:
IRVING M. OBRIECHT,
JAMES D. BROWN.

It is hereby certified that the State of incorporation of the assignee in Letters Patent No. 1,120,618, granted December 8, 1914, upon the application of Miller Reese Hutchison, of West Orange, New Jersey, for an improvement in "Diaphragm-Horns," was erroneously given as "New Jersey," whereas said State should have been given as *Delaware*, as shown by the records of assignments in this office; and that the said Letters Patent should be read with this correction therein that the same may conform to the record of the case in the Patent Office.

Signed and sealed this 16th day of March, A. D., 1915.

[SEAL.]

J. T. NEWTON,

*Acting Commissioner of Patents.*